United States Patent [19]

Astle, Jr.

[11] Patent Number: 4,754,806

[45] Date of Patent: Jul. 5, 1988

[54] RECIPROCATING HEAT EXCHANGER

[76] Inventor: William B. Astle, Jr., 146 Old Farm Rd., Leominster, Mass. 01453

[21] Appl. No.: 907,049

[22] Filed: Sep. 12, 1986

[51] Int. Cl.⁴ ............................................. F28D 19/04
[52] U.S. Cl. .......................................... 165/6; 165/7; 165/10; 165/54; 165/901
[58] Field of Search ..................... 165/6, 10, 7, 54, 901

[56] References Cited

U.S. PATENT DOCUMENTS 3,823,766  7/1974  Sawyer ................................... 165/6

FOREIGN PATENT DOCUMENTS

220867  8/1924  United Kingdom .................... 165/6

Primary Examiner—Albert W. Davis, Jr.

[57] ABSTRACT

A heat exchanger for reclaiming energy from an exhaust airstream. The exchanger includes a porous metal element suitable for absorbing heat from the exhaust airstream, means for reciprocally moving the porous element back and forth transversely to the exhaust airstream, an inlet duct for receiving the exhaust airstream and directing it through the porous element to an outlet duct, and reclaiming air blower means for delivering two heat-reclaiming airstreams through the porous metal element, one on either side of the exhaust airstream, and an air exhaust fan in the path of said exhaust airstream for drawing said airstream through said porous element.

37 Claims, 4 Drawing Sheets

FIG 4D

RECIPROCATING HEAT EXCHANGER

BACKGROUND OF THE INVENTION

This invention relates to air-to-air heat exchangers for reclaiming energy from the air exhausted from heated or cooled buildings. The exhaust from a typical combustion furnace or other heating unit may contain on the order of one third of the energy supplied to the furnace; thus, tremendous losses of energy occur unless energy is reclaimed from the exhaust airstream. Similarly, in airtight buildings where it is desired to exhaust foul air to the ambient and pump fresh air into the building, there is a need for a more effective air-to-air heat exchanger, to reclaim more of the energy from the exhaust air.

Efforts have been made to reclaim energy from exhaust airstreams. The heat recovery wheel, as described in *Energy Conservation Through Heat Recovery*, published in the 1970s by Northern Natural Gas Co., passes the exhaust airstream through one half of a porous heat-absorbing wheel; incoming air is passed through the other half. The wheel slowly turns, transferring heat from the exhaust airstream to the incoming air. Such wheels tend to be very large in size and are typically used in balanced systems where the incoming airstream has the same volumetric flow rate as the exhaust airstream (e.g., the airtight building example).

When the exhaust airstream contains undesirable gases such as products of combustion, the undesirable gases have been purged from the heat recovery wheel to prevent them from being blown back into the building with the incoming air. A pie-shaped purging section at the boundary between the exhaust airstream and the incoming airstream has been employed, in combination with pie-shaped compartments in the wheel, to redirect back through the heat recovery wheel and into the outgoing exhaust incoming air that flows into the pie-shaped section.

SUMMARY OF THE INVENTION

In general the invention features a heat exchanger for reclaiming energy from an exhaust airstream. The exchanger includes a porous metal element suitable for absorbing heat from the exhaust airstream, means for reciprocally moving the porous element back and forth transversely to the exhaust airstream, an inlet duct for receiving the exhaust airstream and directing it through the porous element to an outlet duct, reclaiming air blower means for delivering two heat-reclaiming airstreams through the porous metal element, one on either side of the exhaust airstream, and an air exhaust fan in the path of said exhaust airstream for drawing said airstream through said porous element.

In preferred embodiments, the heat reclaiming airstreams are so located and the reciprocal movement of the porous element is sufficiently long that most portions of the porous element pass twice through a reclaiming airstream for each single pass through the exhaust airstream. An exhaust fan in the exhaust outlet duct draws the exhaust airstream through the porous element. The porous element is compartmentalized by transverse barriers, and means are provided for purging each compartment of undesirable gases (e.g., products of combustion) in the exhaust airstream as each compartment passes out of the exhaust airstream. Purging is done using an air barrier on the side of the porous element on which the exhaust airstream enters, with the barrier being at least about the width of a compartment so that it forces reclaiming air entering the compartment to reverse direction and exit into the outlet duct. The porous element is supported on linear bearings and rods extending along the direction of reciprocal movement. Movement of the porous element is effected by a belt moving in an elongated loop, a roller element attached to the belt, and a U channel connected to the porous element and oriented transversely to the direction of reciprocal movement, so that the roller element may shift position along the U channel when the roller reverses direction at each end of the loop; this drive arrangement is simple and reliable. The porous metal element consists of metal mesh of sufficient density that the weight of the mesh is greater than the weight of exhaust gases passing through the element in one full reciprocation cycle. Safety means for shutting off the source of undesirable exhaust gases (such as products of combustion) is provided; a pressure sensor in the exhaust output duct must sense a positive pressure for the apparatus to continue functioning. Means are provided for shutting off the furnace to which the reclaiming apparatus is attached if the temperature in the exhaust airstream output rises to an abnormal level. Means are provided (e.g., a temperature sensor upstream of the apparatus) for turning on the apparatus only when the furnace is generating a heated exhaust airstream.

The invention provides improved energy recovery in a compact, easily manufactured, easily serviced device. The improvements make energy recovery from exhaust gases suitable for applications for which prior exhaust gas reclaimers were impractical, e.g., on the exhaust of overhead heaters in industrial buildings, and on home furnaces. Alignment and balancing difficulties that can result with the heat recovery wheel are avoided. The invention can be installed in any orientation (although power is minimized if the support rods are horizontal); by contrast, the heat recovery wheel is installed in a vertical orientation. The invention also provides better uniformity of airflow through the porous member because the compartments can be rectangular; in the heat recovery wheel, the compartments are pie shaped, and flow is limited through the narrow portions of the compartments near the axis of rotation. The invention has application in summer as well as winter; energy can be reclaimed from cooled air exhausted from air conditioned buildings. The invention also has application to exhaust airstreams from hospital environments where it is necessary to purge bacteria from the exhaust.

Other advantages and features of the invention will be apparent from the following description of the preferred embodiment and from the claims.

DESCRIPTION OF THE PREFERRED EMBODIMENT

Figure 1:
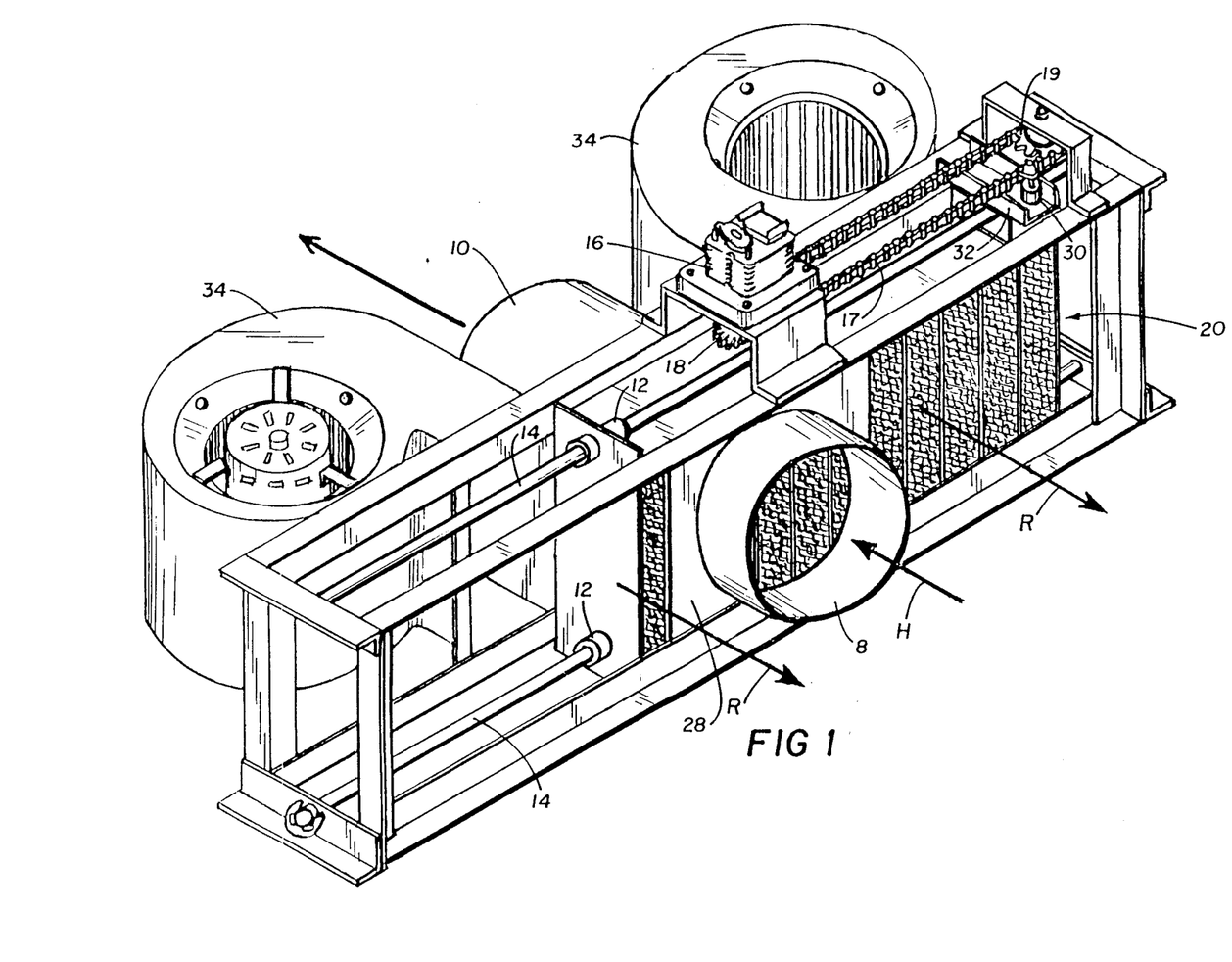
FIG. 1 is a perspective view of the preferred embodiment of the invention.

Shown in the figures is a reciprocating energy reclaimer with exhaust inlet duct 8 (6 inch diameter) for receiving heated exhaust gases from a gas furnace or other clean-burning heating unit. The exhaust gases pass through porous metal member 20 supported in surrounding frame, which is divided into twelve identical compartments 24 by metal partitions 25; each compartment is 1.5 inches wide, 2⅜ inches deep, and filled with 1.5 ounce of a heat-absorbing, porous metal mesh. The mesh is 2.5 inches wide tubular, knitted aluminum, crimped at a 45° angle (available from ACS Industries, Woonsocket, R.I.), and folded in serpentine fashion inside each compartment. The exhaust gases transfer their heat to the porous metal member 20, and exit through outlet duct 10 in which there is located exhaust fan 22 driven by motor 23. The porous metal member 20 and frame are supported for reciprocating motion by four linear ball bearing assemblies 12, two at each end (only two of four show in FIG. 1), that ride on linear rods 14.

Figure 3A:
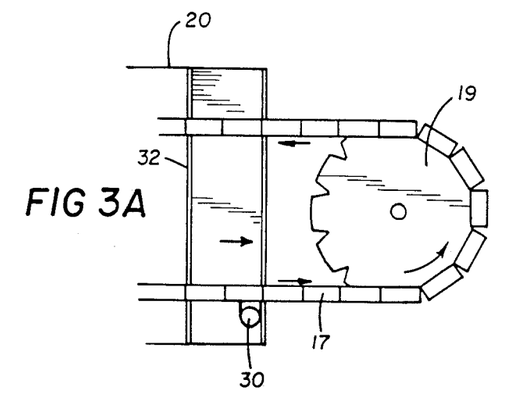
FIGS. 3A, 3B and 3C are three diagrammatic views of three positions of the continuous chain drive and cam-follower used to reciprocate the porous metal element.
Figure 3B:
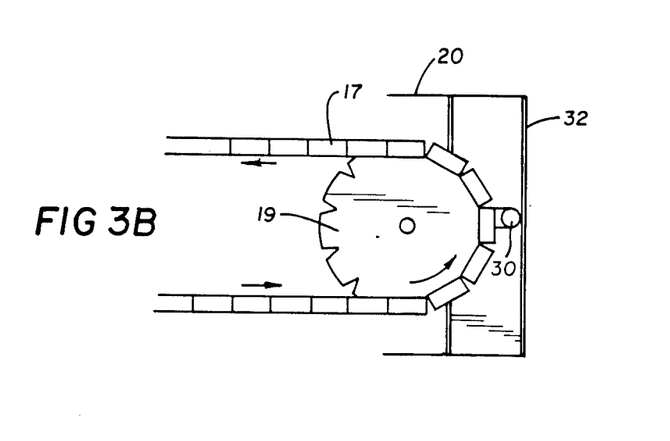
Figure 3C:
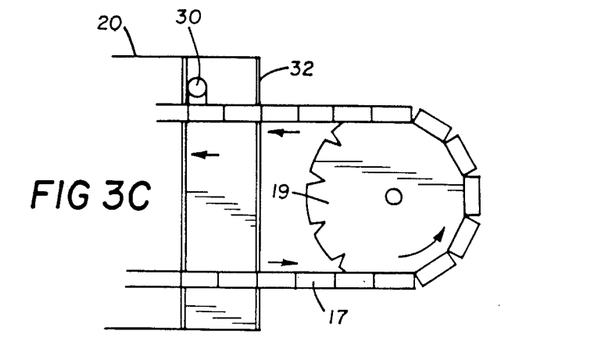

Movement of the porous member 20 is controlled by gear-drive motor 16, which drives continuous chain 17 around sprockets 18, 19 (FIGS. 1 and 3A–3C). Cam-follower 30, which is attached to chain 17, drives U channel 32, which is securely fastened to porous metal member 20. As the cam-follower 30 attached to continuous chain 17 is driven away from the gear motor, the pordus metal member 20 is moved to one extremity of its traverse (FIG. 3A). When the cam-follower reaches the extremity of its travel on the chain 17, the cam-follower repositions itself in the U channel to drive the porous member 20 in the opposite direction (FIGS. 3B and 3C).

Reclaiming air blowers 34 direct reclaiming air through ducts 36 (3.5 inches wide) into the porous metal member. The reclaiming air ducts 36 are separated from the exhaust outlet duct 10 by a plate 38 (1.0 inch wide in the plane of the cross section of FIG. 2). Another plate 28 (1.75 inches wide in the plane of the cross section of FIG. 2) positioned on the opposite side of the porous member 20 acts as an air barrier, and in conjunction with plate 38 accomplishes purging of combustion gases from each compartment prior to energy reclaim.

Figure 2:
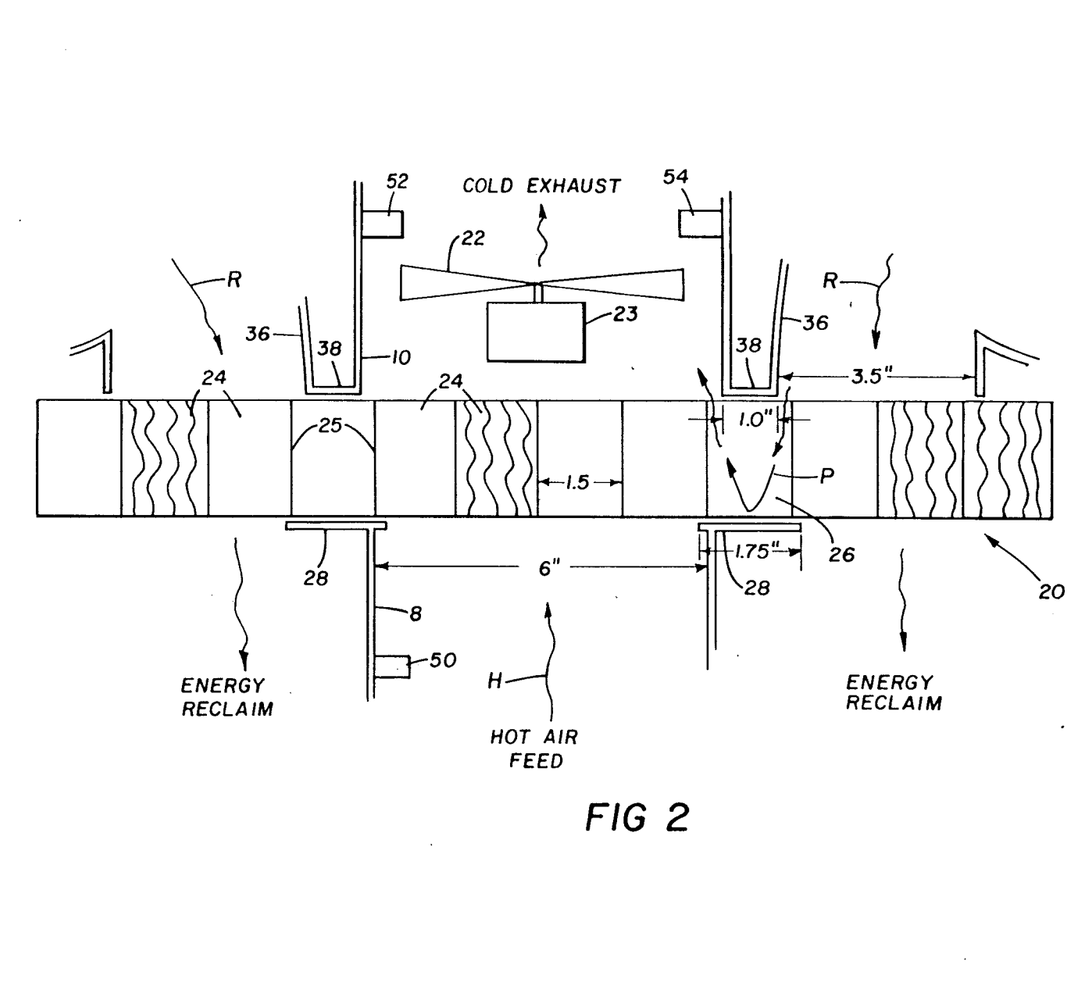
FIG. 2 is a cross-sectional view, somewhat diagrammatic, taken horizontally through FIG. 1.

The reciprocating member is divided into twelve compartments 24 so that each compartment, as it passes from the exhaust airstream into a reclaim airstream, temporarily occupies the position shown at 26 in FIG. 2. One side of the compartment straddles the discharge of the reclaim blower and the exhaust duct, while the other side of the compartment is sealed off by air barrier 28. As a result, residual combustion gases in this compartment are quickly and positively expelled by purge air P moving from the reclaim blower through the compartment to the exhaust. High temperature silicone seals are installed around the porous metal member to prevent leakage between the member and walls 28, 38. Exhaust fan 22 simultaneously draws hot exhaust gases into the metal mesh 20 and draws low temperature toxic fumes out the exhaust flue.

Figure 4A:
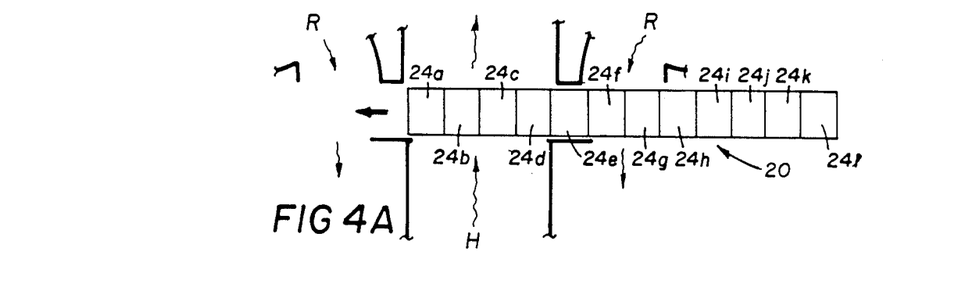
FIGS. 4A, 4B, 4C and 4D show diagrammatically four stages within one full cycle of the reciprocating porous metal assembly.
Figure 4B:
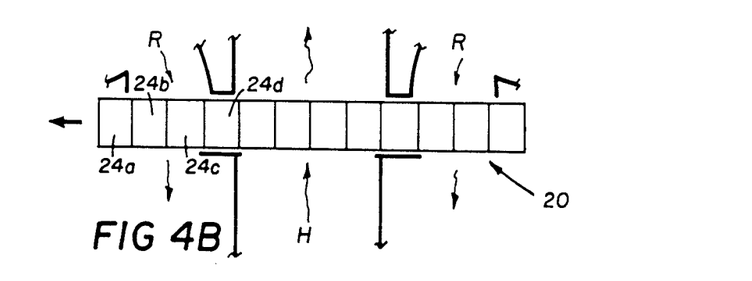
Figure 4C:
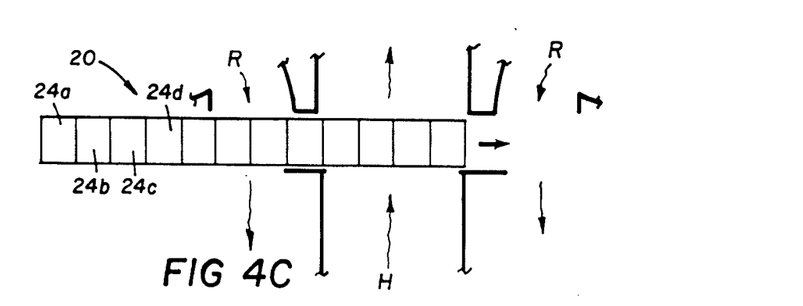
Figure 4D:
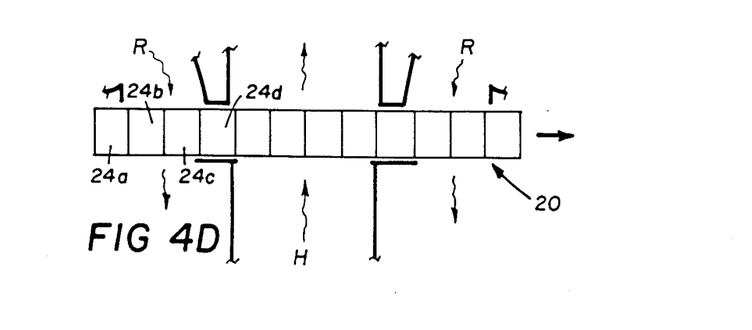

FIGS. 4A to 4D illustrate the reciprocating movement of the porous metal member 20. In FIG. 4A the left-most four compartments 24a–24d are being heated by exhaust gases H. In FIG. 4B these compartments have moved out of the path of the exhaust gases H; compartment 24a has already fully passed once through the reclaiming airstream R, compartments 24b and 24c are in the reclaiming airstream, and compartment 24d is in the Purging position. In FIG. 4C all four of compartments 24a–24d have made one pass through the reclaiming airstream. In FIG. 4D the same four compartments are making their second pass through the reclaiming airstream.

All of the compartments, except the middle two, 24f, 24g, make two complete passes through a reclaiming airstream R for each pass through the heated exhaust gases H. The middle compartments 24f, 24g make a single pass, but they pause while exposed to the reclaiming air when the porous member 20 reverses direction, thus lengthening their exposure to the reclaiming air.

Home and industrial combustion heating units typically exhaust to the atmosphere approximately one third of all input energy (BTUs) fed the heating unit. That lost energy is recovered by passing reciprocating porous metal member 20 through the heated exhaust airstream H, and reclaiming the heat from the porous metal member by passing reclaiming air R through the member. A positive exhaust fan 22 is positioned on the discharge side of the exhaust airstream (200 cfm for a 100,000 BTU/hour furnace). The front portions of the porous metal member 20 (i.e., the portions nearest the feed of heated gases) will absorb virtually all the exhaust heat, and reach a temperature equal to the temperature of the exhaust gases, as the reciprocating porous metal member 20 passes through the exhaust airstream. The metal member is then subjected to a high volume-high velocity (465 cfm) reclaim blower forcing reclaiming air R through the porous member. The reclaiming air causes the temperature of the porous member on the exhaust side to be maintained equal to the temperature of the air discharged by the reclaim blower (typically room temperature).

The greater the volumetric flow rate of the reclaim air (as compared to the exhaust), the smaller the porous member 20 needs to be. It is preferred that the reclaim airflow for each reclaim airstream be from 1 to 4 times the exhaust airflow, and most preferably 2 to 2.50 times. Because the majority of compartments 24 are exposed twice to reclaim air for each pass through the exhaust airstream, the ratio of total reclaim airflow to exhaust airflow for these compartments is twice the numbers just given, i.e., preferably from 2 to 8 or most preferably 4 to 5.

The invention allows up to 95% of the exhaust energy (BTU's) to be reclaimed from any hot exhaust stack. Installation requires removing a small section of the exhaust duct and securely fastening the remaining ducts to the inlet and outlet ducts 8, 10 of the heat exchanging apparatus.

As the hot exhaust gases rise into inlet duct 8, they are positively drawn through the porous metal member 20 by exhaust fan 22. This fan has the capacity to always cause a slight negative pressure in the hot exhaust inlet duct 8. As the hot exhaust gas contacts the porous metal member 20, the heat in the exhaust air dissipates into the metal member. The metal member is of such porosity as to not hinder the exhaust fan from maintaining a negative pressure at the inlet duct 8.

The porous metal member is preferably constructed of mesh of such weight and density that the area and thickness of the mesh directly in front of inlet 8 has the capacity to absorb all exhaust heat rising into it. Both reclaim blowers should have a capacity of counterflowing sufficient air (460 cfm) to reduce the metal mesh temperature to the reclaim blower discharge temperature. The porous metal member is preferably cycled at 13 cycles per minute. This frequency is based on tests which have shown that 10 cycles/minute should occur for every 50,000 BTU/hour of energy in the exhaust airstream. For a 200,000 BTU/hour furnace, which sends one third of its energy up the exhaust flue, the frequency is 13 cycles/minute.

The total weight of the porous metal mesh traversing through the hot gaseous airstream in any given period should equal at least the weight of the air passing through the metal mesh for the same period. To produce maximum heat reclaim, it is preferable that the weight of the porous mesh traversing through the hot gaseous exhaust airstream be from one to four times (most preferably two to four times) the weight of the hot gaseous exhaust airstream flow for any given period of time.

In operation, the reclaiming apparatus remains inactivated until an on/off heat sensor 50 located in the hot air feed duct 8 is heated to 210° to 240° by the furnace turning on (the sensor would preferably be located closer to the furnace than shown in the drawing). When this sensor detects a temperature of 210° to 240°, it automatically starts motors 16, 23 and both reclaim blowers 34, thus initiating reciprocating movement of porous metal member 20, and positive pumping of the exhaust airstream through porous metal element 20. At the same time, a normally-closed thermal time-delay relay in the circuit to the furnace gas valve is activated, giving the apparatus approximately twenty seconds in which to raise the pressure in the exhaust duct 10, and thereby close the normally-open contacts of a pressure switch 52 connected in series with the gas valve. If the exhaust is not functioning properly (e.g., because fan 22 or motor 23 are not functioning, or flow through porous element 23 is blocked), the circuit to the gas valve would be opened resulting in shutdown of the furnace as well as the reclaiming apparatus.

If gear motor 16 or the reclaim blowers 34 fail, the resulting high temperatures in the ordinarily cold exhaust duct 10 will trip a thermal protection switch (located in the duct and set to trip at 200° F.), shutting off electrical power to the furnace gas valve and the reciprocating energy reclaiming apparatus. The thermal protection switch 54 is of the automatic reset (at 160° F.) type. As a safety backup if the thermal protection switch fails, there is a thermal switch in exhaust motor 23 that will also trip and shut off exhaust motor 23, resulting in shut off of both the gas valve and the reclaiming apparatus. Should any electrical component have a fault, an electrical fuse built into the reciprocating energy reclaiming apparatus would blow, shutting off the gas valve and apparatus.

The safety features can be summarized as follows:

Should any of the three fans or the reciprocating gear motor fail to function properly, safety controls will automatically shut off the main gas valve to the gas furnace.

Should the exhaust fan 22 fail to function, a pressure switch on the discharge of the fan would lose pressure, resulting in the main gas valve circuit being interrupted.

If the reciprocating gear motor 16 fails to function, there would be no heat exchange, resulting in the exhaust hot air passing straight through the mesh heating up the temperature switch located in discharge duct 10. This switch which is normally closed, will open the circuit to the gas valve resulting in the gas being shut off.

Should either of the reclaim fans fail, this will result in high temperature air passing into the exhaust duct, and will also trip the high temperature limit switch. This automatic reset limit switch will trip at 200° F.

If the on/off temperature control fails to function, again the high temperature air would enter the exhaust duct and trip the high temperature limit switch. A second safety feature on the on/off control is the fact that there would be no pressure to the exhaust pressure switch, and once twenty seconds have past the gas valve would be shut off.

The described reciprocating energy reclaiming apparatus is simple to fabricate (e.g., it can be made with 18 to 20 gauge sheet metal and electric spotwelding). The porous metal member 20 can be quickly removed for access and cleaning; two horseshoe clips on either end of the dual traverse rods 14 are removed, and the rods pulled out through the linear bearings and framework; allowing the porous metal member 20 to drop out easily. Cleaning of member 20 should ordinarily not be necessary except at multi-year intervals because of the continuous exposure of the member to counterflowing air currents H, R.

As reclaiming apparatus of the invention operates only when the combustion chamber is fired (the sensors automatically turn it on and off), the monetary savings achievable by installing the unit is between ten to fifteen times the expense of electricity to operate the unit (primarily to operate the reclaim blowers 34). These figures are based on ten cents per kilowatt hour and fifty cents per 100M BTU. Normal payback in industry should be between one and two years, and in domestic installations between two and three years.

Other Embodiments

Other embodiments are within the scope of the claims. For example, other porous, heat-absorbing materials than the disclosed metal mesh could be used. The safety controls for turning on the reclaiming apparatus could differ; another approach, which is equally as good, and perhaps preferable over the one earlier described, is to have the furnace controls integrated with the reclaimer controls so that exhaust fan 22 is turned on before the furnace gas valve, which is then not turned on unless pressure switch 52 signals a positive pressure in output duct 10, indicating an unobstructed exhaust path for combustion gases.

I claim:

1. A heat exchanger for reclaiming energy from an exhaust airstream, said exchanger comprising
   a porous element suitable for absorbing heat from said exhaust airstream,
   means for reciprocally moving said porous element back and forth traversely to said exhaust airstream,
   an inlet duct for receiving said exhaust airstream and directing it through said porous element to an outlet duct,
   reclaiming air blower means for delivering two heat-reclaiming airstreams through said porous element, one on either side of said exhaust airstream, and
   an air exhaust fan in the path of said exhaust airstream for drawing said airstream through said porous element,
   said blower means and said exhaust fan being sized so that the total volumetric rate of flow in said reclaiming airstreams is equal to or greater than in said exhaust airstream.

2. The apparatus of claim 1 wherein said heat reclaiming airstreams are so located and the reciprocal movement of said porous element is sufficiently long that most of said porous element passes twice through a reclaiming airstream for each single pass through said exhaust airstream.

3. The apparatus of claim 1 wherein said porous element movement is along a straight line.

4. The apparatus of claim 1 wherein said reclaiming airstreams flow counter to said exhaust airstream.

5. The apparatus of claim 4 wherein
said exhaust airstream contains undesirable gases such as combustion gases from a combustion heating unit,
said porous element is compartmentalized by transverse barriers, and
purging means are provided for purging each compartment of said undesirable gases as the compartment passes out of said exhaust airstream by directing a portion of said reclaiming airstream through each compartment and into said outlet duct as that compartment leaves said exhaust airstream.

6. The apparatus of claim 5 wherein said purging means further comprises an air barrier on the side of said porous element on which the exhaust airstream enters, said barrier being at least the width of a said compartment so that it forces reclaiming air entering said compartment to reverse direction and exit into said outlet duct.

7. The apparatus of claim 1 wherein said means for reciprocally moving said porous element comprises
one or more rods extending along the direction of reciprocal movement, and
linear bearing means supporting said porous element on said rods, said bearing means providing low-friction, long-wearing support for said porous element.

8. The apparatus of claim 7 wherein said means for reciprocally moving further comprises
a driven continuous belt (e.g., a chain) moving in an elongated loop, the long dimension of said loop extending along the direction of reciprocal movement,
a pusher element attached to said belt, and
a channel connected to said porous element and oriented transversely to said direction of reciprocal movement and adapted to allow said pusher element to shift position along its transverse extent when said pusher element reverses direction at each end of said loop.

9. The apparatus of claim 8 wherein said linear bearing means comprises linear ball bearings.

10. The apparatus of claim 1 wherein said porous element comprises metal mesh sufficiently porous to pass said exhaust airstream.

11. The apparatus of claim 10 wherein said porous element is of sufficient density that the weight of the gases in said exhaust airstream passing through said porous element in one full reciprocation cycle of said element is no greater than the weight of said element.

12. The apparatus of claim 11 wherein the weight of said element is from two to four times the weight of said exhaust gases passing through in one full reciprocation cycle.

13. The apparatus of claim 1 wherein said exhaust airstream contains undesirable elements such as products of combustion from a combustion heating unit or bacteria from a hospital environment.

14. The apparatus of claim 13 wherein said exhaust gases contain combustion gases from a combustion heating unit.

15. The apparatus of claim 14 wherein said exhaust airstream is from a furnace.

16. The apparatus of claim 15 wherein said furnace burns a clean burning fuel (e.g., natural gas, propane, or butane).

17. The apparatus of claim 13 further comprising safety means for shutting off or preventing start-up of the source of said undesirable exhaust gases (such as the gas supply to a gas furnace) if a positive pressure is not detected at the exhaust airstream output of said apparatus.

18. The apparatus of claim 17 wherein said safety means further comprises means for shutting off said source if the temperature in said exhaust airstream output rises substantially above the normal temperature for said output airstream.

19. The apparatus of claim 13 further comprising activation means for turning on said apparatus so that said reciprocating movement begins and said reclaiming air blower means is activated only when said furnace is generating a heated exhaust airstream.

20. The apparatus of claim 19 wherein said activation means comprises a temperature sensor in said exhaust airstream upstream of said porous element and means for turning on said apparatus when the temperature sensed by said sensor exceeds a preset value.

21. The apparatus of claim 1 wherein said exhaust airstream is cooled air from an air conditioned building.

22. The apparatus of claim 13 further comprising safety means for preventing start-up of said furnace when heat is demanded by the furnace controls unless there is first an indication that said exhaust airstream is flowing through said reclaiming apparatus.

23. The apparatus of claim 22 wherein said safety means comprises a pressure sensor in the exhaust outlet duct of said apparatus for detecting that an exhaust fan in said duct is drawing an exhaust airstream through said porous element.

24. The apparatus of claim 8 wherein said pusher element is a cam-follower.

25. The apparatus of claim 1 wherein said heat reclaiming airstreams are so located and the reciprocal movement of said porous element is sufficiently long that, in each cycle of said porous element, most of said porous element has a longer residence time in said reclaiming airstreams than in said exhaust airstream.

26. The apparatus of claim 1 wherein the total volumetric rate of flow in said reclaiming airstreams is from 2 to 8 times greater than in said exhaust airstream.

27. The apparatus of claim 26 wherein the totoal volumetric rate of flow in said reclaiming airstreams is from 4 to 5 times greater than in said exhaust airstream.

28. The apparatus of claim 2 wherein the heat capacity of said porous member, the airflow rates of said reclaiming and exhaust airstreams, and the size, orientation, and relative movement of said porous member, reclaiming airstream, and exhaust airstream are selected so that the temperature of the exhaust side of said porous member while in the exhaust airstream is maintained near the temperature of said reclaiming air entering said exhaust side of said porous member so that substantially all of the heat in said exhaust airstream is reclaimed.

29. The apparatus of claim 1 wherein said exhaust airstream contains undesirable gases such as combustion gases from a combustion heating unit and wherein said apparatus further comprises purging means for directing a purging airstream through portions of said porous element emerging from said exhaust airstream so that said undesirable gases will not enter said reclaiming airstreams.

30. The apparatus of claim 29 wherein said purging means comprises means for directing a purging airstream uncontaminated with said undesirable gases along a flow path extending through said emerging portions of said porous element and exiting in said exhaust airstream at the exhaust side of said porous element.

31. The apparatus of claim 30 wherein said porous element is compartmentalized by barriers so that said purging airstream may be isolated from said reclaiming airstream.

32. The apparatus of claim 31 wherein said purging airstream is ambient air.

33. The apparatus of claim 32 wherein said purging airstream is a portion of said reclaiming airstream.

34. The apparatus of claim 1 wherein said reclaiming airstreams flow counter to said exhaust airstream and the paths of said airstreams through said porous element are straight, thereby to enhance heat transfer.

35. The apparatus of claim 1 wherein there is only one said reciprocating porous element.

36. The apparatus of claim 1 wherein said porous element is compartmentalized by barriers adapted to prevent air flow through said porous element in the direction of movement of said porous element and said exhaust airstream and reclaiming airstreams are sufficiently separated along said direction of movement so that airflow between said exhaust airstream and reclaiming airstreams is prevented.

37. The apparatus of claim 1 wherein
said porous element is compartmentalized by barriers adapted to prevent air flow through said porous element in the direction of movement of said porous element and said exhaust airstream and reclaiming airstreams are sufficiently separated along said direction of movement so that airflow between said exhaust airstream and reclaiming airstreams is prevented;

the volumetric rate of flow is greater in said reclaiming airstreams than in said exhaust airstream;

said exhaust airstream contains undesirable gases such as combustion gases from a combustion heating unit and wherein said apparatus further comprises purging means for directing a purging airstream through portions of said porous element emerging from said exhaust airstream so that said undesirable gases will not enter said reclaiming airstreams; and said reclaiming airstreams flow counter to said exhaust airstream.

* * * * *

UNITED STATES PATENT AND TRADEMARK OFFICE
CERTIFICATE OF CORRECTION

PATENT NO. : 4,754,806
DATED : July 5, 1988
INVENTOR(S) : William B. Astle, Jr.

It is certified that error appears in the above-identified patent and that said Letters Patent are hereby corrected as shown below:

Column 3, line 26, "pordus" should be --porous--.

Column 3, line 66, "Purging" should be --purging--.

Claim 27, line 1, "totoal" should be --total--.

Claim 28, line 1, "claim 2" should be --claim 1--.

Signed and Sealed this

Twenty-ninth Day of November, 1988

Attest:

DONALD J. QUIGG

Attesting Officer

Commissioner of Patents and Trademarks